(12) United States Patent
Katagiri (10) Patent No.: US 7,826,741 B2
(45) Date of Patent: Nov. 2, 2010

(54) OPTICAL NETWORK SYSTEM (75) Inventor: Toru Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 496 days.

(21) Appl. No.: 11/829,199

(22) Filed: Jul. 27, 2007

(65) Prior Publication Data
US 2008/0080860 A1 Apr. 3, 2008

(30) Foreign Application Priority Data
Sep. 29, 2006 (JP) ............... 2006-268711

(51) Int. Cl.
*H04J 14/00* (2006.01)
(52) U.S. Cl. ............... 398/43; 398/79; 398/135; 398/58; 398/182; 370/466; 370/474; 370/351; 370/352; 370/392; 385/24; 385/37
(58) Field of Classification Search ............... 398/43, 398/79, 140, 141, 33, 58, 98, 68, 75, 59, 398/82, 182, 42, 77, 91, 135, 136, 138, 139, 398/158, 159, 183, 192; 370/498, 535, 512, 370/476, 465, 545, 907, 351, 352, 466, 474, 370/392, 503, 473, 464; 385/24, 37
See application file for complete search history.

(56) References Cited
U.S. PATENT DOCUMENTS
7,099,584 B1 * 8/2006 Narvaez et al. ............... 398/58
7,324,548 B2 * 1/2008 Natarajan et al. ............... 370/465
7,433,371 B2 * 10/2008 Atsumi et al. ............... 370/498

OTHER PUBLICATIONS

Hussain Qureshi, et al. "Generic Framing Procedure ITU-T G.7041" Electronic Products Solutions Group, Telecomms Networks Test Division, Scotland.
Maarten Vissers. "Optical Transport Network & Optical Transport Module: Digital Wrapper" Lucent Technologies, Apr. 2002.

\* cited by examiner

*Primary Examiner*—Hanh Phan
(74) *Attorney, Agent, or Firm*—Fujitsu Patent Center (57) ABSTRACT

An optical transponder includes a mapping unit mapping, out of multiple types of signals including a first client signal and a second client signal that transmission rates are different from each other, the first client signal having a lower transmission rate to a Generic Framing Procedure (GFP) frame defined in ITU-T Recommendations; a coding unit applying 64B/66B coding to the first client signal mapped to the GFP frame; and a multiplexing unit multiplexing the first client signal to which the 64B/66B coding has been applied and the second client signal in a frame conforming to an Optical Transport Network (OTN) defined in ITU-T Recommendations; in which the first client signal and the second client signal are accommodated in an identical frame in a mixed manner and transmitted as an optical signal having one wavelength.

5 Claims, 11 Drawing Sheets

OPTICAL NETWORK SYSTEM

BACKGROUND OF THE INVENTION

The present invention relates to an optical network system in which multiple types of low-speed signals are accommodated in an identical frame of a high-speed signal in a mixed manner and transmitted (including exchanged and forwarded), and more particularly, to an optical signal transmission technique which allows both of a SONET/SDH signal of about 10 Gbps and a 10 GbE-LANPHY signal whose bit rates are different from each other to be accommodated in a single 40-Gbps wavelength path in a mixed manner and transparently mapped.

In order to deal with an increased demand for data communications as represented by the Internet, larger-capacity communication systems are expected. As one of measures for larger capacity systems, increased-bit-rate communication systems have been studied. At this time, it is required to accommodate a conventional low-bit-rate signal in a frame of a high-speed signal whose bit rate is increased and transmit it.

For example, in Optical Transport Network (OTN) specified in ITU-T (International Telecommunications Union-Telecommunication Standardization Sector) Recommendations G.709, a frame format has been studied in which client signals of about 2.5 Gbps, such as Synchronous Optical Network (SONET) Optical Carrier-Level 48 (OC-48)/OC-48c signals or Synchronous Digital Hierarchy (SDH) Synchronous Transmission Module-Level 16 (STM-16) signals, are subjected to 16-channel multiplexing to generate an optical signal of Optical Transport Unit 3 (OTU3) for OTN having a transmission rate of about 43 Gbps.

Further, a frame format has been studied in which client signals of about 10 Gbps, such as SONET OC-192/OC-192c signals or SDH STM-64 signals, are subjected to 4-channel multiplexing to generate an optical signal of OTU3 for OTN having a transmission rate of about 43 Gbps.

Furthermore, a frame format has been studied in which 10 GbE-LANPHY signals (Ethernet™ signals) are subjected to 4-channel multiplexing to generate an optical signal corresponding to OTU3 for OTN having a transmission rate of about 44 Gbps.

In the above description, when a SONET/SDH signal and a 10 GbE-LANPHY signal which serve as client signals having a transmission rate of about 10 Gbps are taken up, the respective client signals can be accommodated by applying 4-channel multiplexing thereto, but since both the signals have different transmission rates, i.e., 9.95 Gbps and 10.3 Gbps, it is difficult to accommodate the signals in the same frame in a mixed manner.

Figure 1:
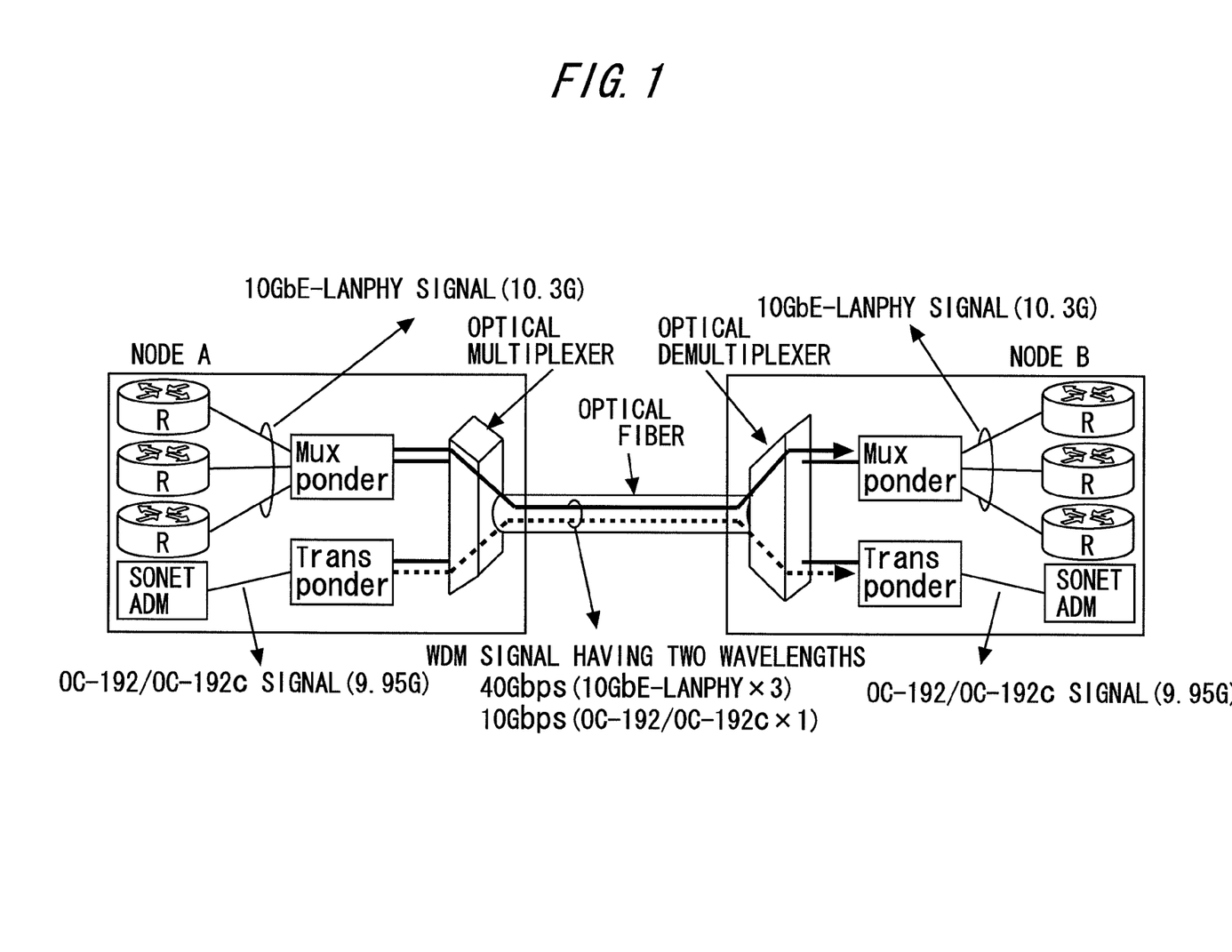
FIG. 1 is a block diagram showing a configuration of a conventional optical network system.

With reference to FIG. 1 showing an example of a conventional optical network system, in a case where three 10 GbE-LANPHY signals (10.3 Gbps) and one SONET OC-192c signal (9.95 Gbps) are to be transparently mapped to a wavelength path of an OTU3 frame conforming to ITU-T Recommendations G.709, which has a bit rate of 40 Gbps for one wavelength, and transferred between nodes A and B constituting communication sites, for example, in New York and Boston, since the SONET OC-192c signal of about 10 Gbps and the 10 GbE-LANPHY signals have different bit rates, it is impossible to map both types of the signals to a single 40-Gbps wavelength path in a mixed manner.

Specifically, in the optical network system shown in FIG. 1, the transmission-side node A is configured by including, as transmission-side components, three layer 2/layer 3 switches (R) for transmitting the respective 10 GbE-LANPHY signals (client signals), a SONET/SDH Add/Drop Multiplexer (ADM) device for transmitting the SONET OC-192/OC-192c signal (client signal), an N-to-1 transponder (Muxponder) for multiplexing three client signals to generate an optical signal having a first wavelength and sending the optical signal to an optical multiplexer, a 1-to-1 transponder for sending one client signal to the optical multiplexer as an optical signal having a second wavelength, and the optical multiplexer for multiplexing (wavelength multiplexing) and sending the optical signal having the first wavelength received from the N-to-1 transponder and the optical signal having the second wavelength received from the 1-to-1 transponder to a single optical fiber serving as a transmission line.

The reception-side node B is configured by including, as reception-side components, an optical demultiplexer for demultiplexing (wavelength demultiplexing) and sending the optical signals having the first wavelength and the second wavelength received via the single optical fiber to an N-to-1 transponder and a 1-to-1 transponder, the N-to-1 transponder (Muxponder) for demultiplexing the optical signal having the first wavelength received from the optical demultiplexer to three client signals and sending them, the 1-to-1 transponder for sending the optical signal having the second wavelength received from the optical demultiplexer as one client signal, three layer 2/layer 3 switches (R) for receiving three 10 GbE-LANPHY signals from the N-to-1 transponder, respectively, and a SONET/SDH ADM device for receiving one SONET OC-192/OC-192c signal from the 1-to-1 transponder.

Figure 2A:
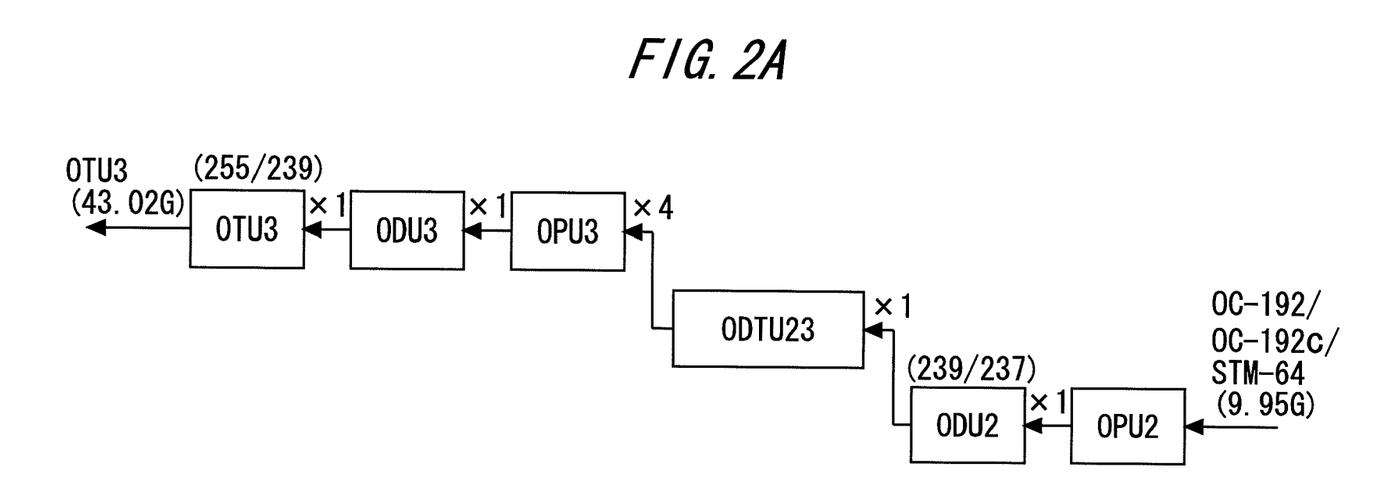
FIG. 2A is a diagram showing a transparent-mapping accommodation method for a SONET/SDH signal of about 10 Gbps.
Figure 2B:
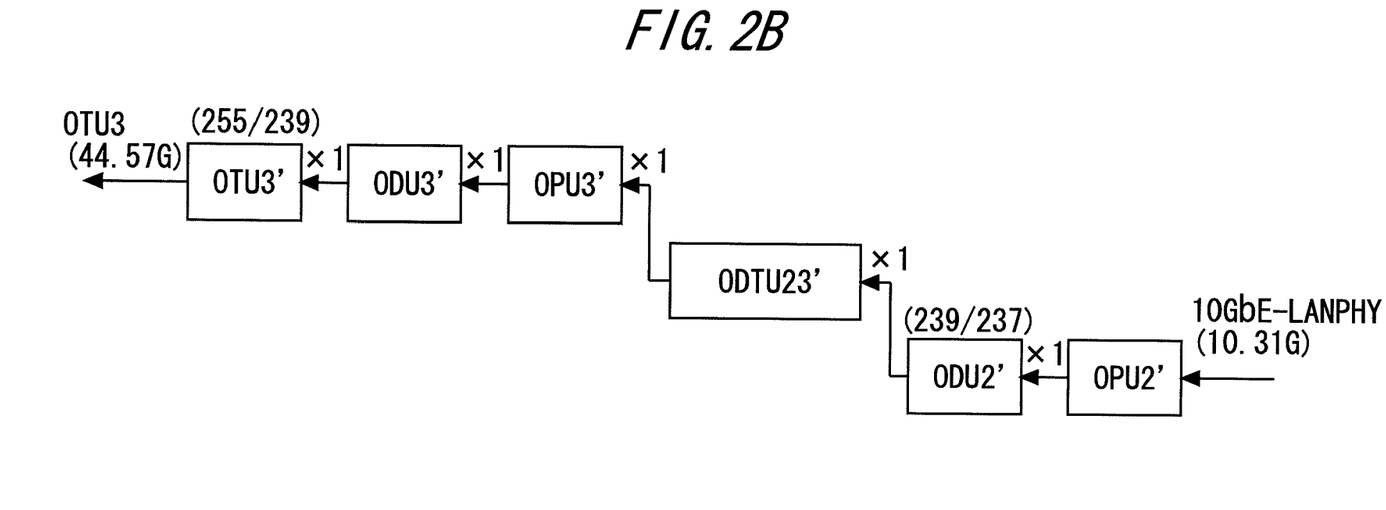
FIG. 2B is a diagram showing a transparent-mapping accommodation method for a 10 GbE-LANPHY signal.

FIG. 2A shows an accommodation method in which a SONET/SDH signal of about 10 Gbps (such as a SONET OC-192/OC-192c signal or an SDH STM-64 signal) is transparently mapped to the OTU3 frame conforming to ITU-T Recommendations G.709. FIG. 2B shows an accommodation method in which a 10 GbE-LANPHY signal is transparently mapped to a frame (described as OTU3' in FIG. 2), which corresponds to the OTU3 frame conforming to ITU-T Recommendations G.709. In this case, OTU3', ODU3', OPU3', ODTU23', ODU2', and OPU2' shown in FIG. 2B and OTU3, ODU3, OPU3, ODTU23, ODU2, and OPU2 defined in ITU-T Recommendations G.709 are identical in frame structure and different in bit rate, respectively. As is clear from FIGS. 2A and 2B, since the SONET/SDH signal of about 10 Gbps and the 10 GbE-LANPHY signal have different bit rates, it is impossible to accommodate both the signals in a mixed manner and transparently map them to a single 40 Gbps wavelength path (frame).

Accordingly, in the conventional optical network system mentioned above, the nodes A and B use one 40-Gbps wavelength path to transmit three 10 GbE-LANPHY signals (10.3 Gbps) and one SONET OC-192c signal (9.95 Gbps) as a wavelength division multiplexing (WDM) signal having two wavelengths.

As a result, it is inevitable that wavelength resources are wasted and the operation efficiency of a WDM optical network is decreased. Further, since two types of transponders are required, the number of devices provided for each node is increased.

The following are related arts to the present invention.

[Non-Patent document 1] (Related art regarding OTN defined in ITU-T Recommendations)

ITU-T G.709/Y.1331 Interfaces for the Optical Transport Network (OTN)

[Non-Patent document 2] (Related art regarding Generic Framing Procedure (GFP) defined in ITU-T Recommendations G.7041) ITU-T G.7041/Y.1303 Generic framing procedure (GFP)

SUMMARY OF THE INVENTION

An object of the present invention is to provide an optical signal transmission technique in which multiple types of low-speed signals are accommodated in an identical frame of a high-speed signal in a mixed manner and transmitted.

Another object of the present invention is to provide an optical signal transmission technique which allows a SONET/SDH signal having a bit rate of 9.95 Gbps, such as an OC-192, OC-192c, or STM-64 signal and a 10 GbE-WAN-PHY signal having a bit rate of 9.95 Gbps, and a 10 GbE-LANPHY signal having a bit rate of 10.3 Gbps to be transparently mapped and accommodated in a mixed manner in one wavelength (one wavelength path) on the optical network having a transmission rate of about 40 Gbps.

In order to achieve the above-mentioned objects, according to one feature of the present invention, a special framing process and coding are applied to the SONET/SDH signal or the 10 GbE-WANPHY signal so as to adjust the bit rate of the SONET/SDH signal or the 10 GbE-WANPHY signal to a bit rate corresponding to that of the 10 GbE-LANPHY signal, and then both the signals are accommodated in a mixed manner, transparently mapped to one wavelength of a WDM signal, and transmitted.

According to the present invention, there is provided a first optical transponder, including: a mapping unit mapping, out of multiple types of signals including a first client signal and a second client signal whose transmission rates are different from each other, the first client signal having a lower transmission rate to a Generic Framing Procedure (GFP) frame defined in ITU-T Recommendations; a coding unit applying 64B/66B coding to the first client signal which has been mapped to the GFP frame; and a multiplexing unit multiplexing the first client signal to which the 64B/66B coding has been applied and the second client signal in a frame conforming to an Optical Transport Network (OTN) defined in ITU-T Recommendations; in which the first client signal and the second client signal are accommodated in an identical frame in a mixed manner and transmitted as an optical signal having one wavelength.

According to the present invention, there is provided a second optical transponder, including: a mapping unit mapping, out of multiple types of signals including a first client signal and a second client signal whose transmission rates are different from each other, the first client signal having a lower transmission rate to a GFP frame defined in ITU-T Recommendations; and a multiplexing unit multiplexing the first client signal which has been mapped to the GFP frame and the second client signal in a frame conforming to an OTN defined in ITU-T Recommendations; in which the first client signal and the second client signal are accommodated in an identical frame in a mixed manner and transmitted as an optical signal having one wavelength.

According to the present invention, there is provided a first optical signal transmission method, including: mapping, out of multiple types of signals including a first client signal and a second client signal whose transmission rates are different from each other, the first client signal having a lower transmission rate to a GFP frame defined in ITU-T Recommendations; applying 64B/66B coding to the first client signal which has been mapped to the GFP frame; and multiplexing the first client signal to which the 64B/66B coding has been applied and the second client signal in a frame conforming to an OTN defined in ITU-T Recommendations; in which the first client signal and the second client signal are accommodated in an identical frame in a mixed manner and transmitted as an optical signal having one wavelength.

According to the present invention, there is provided a second optical signal transmission method, including: mapping, out of multiple types of signals including a first client signal and a second client signal whose transmission rates are different from each other, the first client signal having a lower transmission rate to a GFP frame defined in ITU-T Recommendations; and multiplexing the first client signal which has been mapped to the GFP frame and the second client signal in a frame conforming to an OTN defined in ITU-T Recommendations; in which the first client signal and the second client signal are accommodated in an identical frame in a mixed manner and transmitted as an optical signal having one wavelength.

According to the present invention, it is possible to accommodate a SONET/SDH signal of about 10 Gbps or a 10 GbE-WANPHY signal and a 10 GbE-LANPHY signal in one wavelength in a mixed manner, so wavelength resources to be used can be reduced and the operation efficiency of a WDM optical network is increased due to an effective use of wavelength. Further, the number of required devices can be reduced.

Other objects, features, and advantages of the present invention will be apparent by reading the specification (embodiment) described below when they are taken up together with the drawings and the scope of claims.

DETAILED DESCRIPTION OF THE PREFERRED EMBODIMENTS

Hereinafter, the present invention is described in more detail with reference to the accompanying drawings. The drawings show a preferred embodiment of the present invention. However, the present invention can be implemented in many different modes and it should not be construed that the present invention is limited to the embodiment described in this specification. The embodiment is rather provided so as to disclose this specification completely and perfectly and to inform those skilled in the art of the scope of the present invention sufficiently.

[Optical Network System Configuration]

Figure 3:
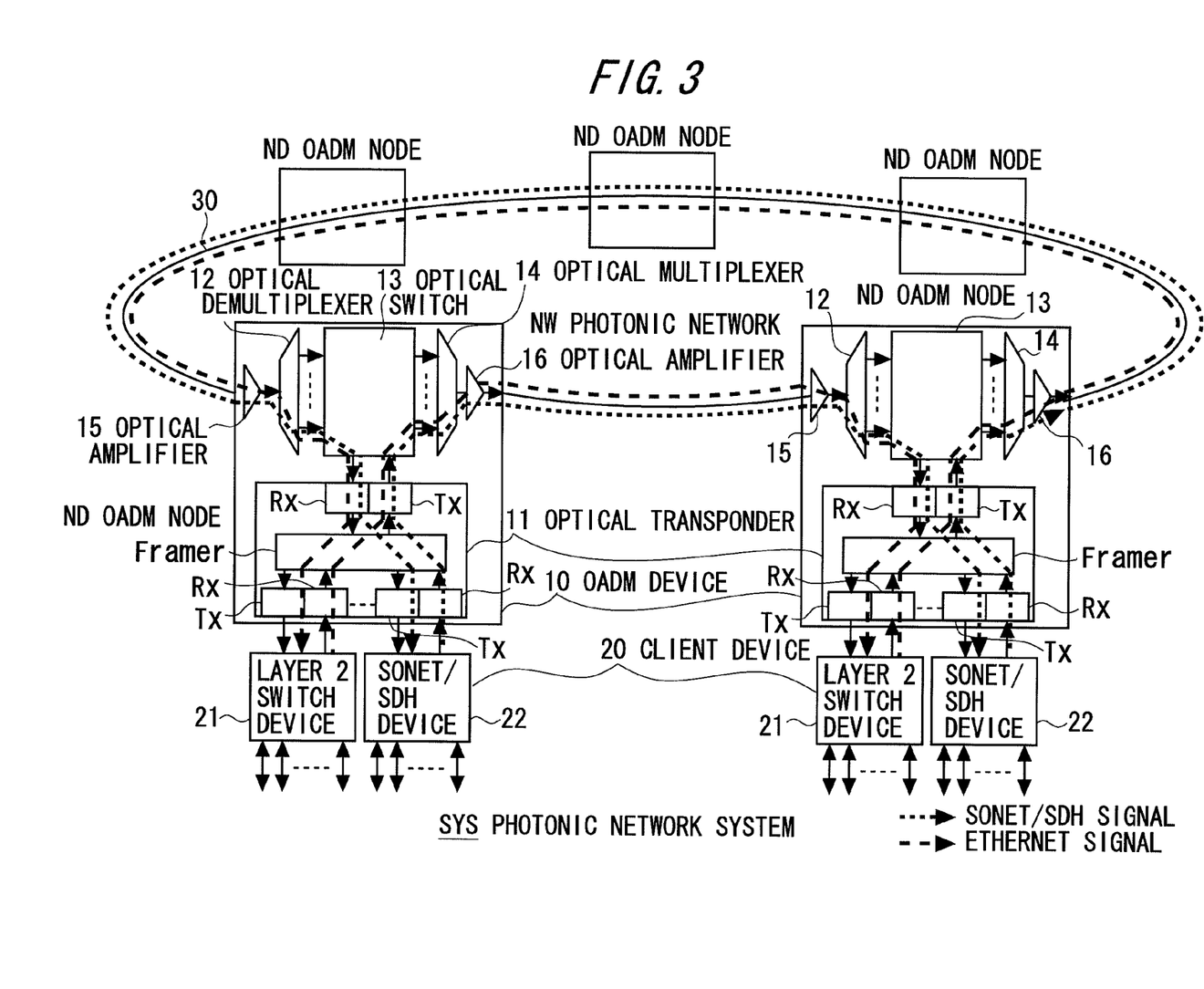
FIG. 3 is a block diagram showing a configuration of an optical network system according to an embodiment of the present invention.

Referring to FIG. 3 showing a system configuration according to an embodiment of the present invention, an optical network system (in this embodiment, referred to as photonic network system) SYS includes multiple Optical Add/Drop Multiplexing (OADM) devices 10, an optical fiber transmission line 30 connecting the OADM devices 10 in a ring-shaped manner, and a layer 2 switch device 21 and a SONET/SDH device 22 which serve as a client device 20 connected to a corresponding one of the OADM devices 10. Each OADM node ND includes the OADM device 10, the layer 2 switch device 21, and the SONET/SDH device 22.

In the photonic network system SYS, a WDM signal which is obtained by applying wavelength division multiplexing to optical signals having at least one or more different wavelengths is transmitted on a photonic network NW having the optical fiber transmission line 30.

FIG. 3 shows a case where the photonic network NW has a ring-type network topology. Another network topology having a point-to-point, linear, or mesh architecture can also be applied.

In this case, as client signals, SONET signals (ANSI Recommendation T1.105: Synchronous Optical Network Basic Description Including Multiplex Structures, Rates, and Formats), SDH signals (ITU-T Recommendations G.803: Architecture of Transport Networks Based on the Synchronous Digital Hierarchy), Ethernet™ signals (IEEE 802.3), or the like can be applied.

The OADM device 10 of each OADM node ND has a function of receiving and outputting a client signal from the layer 2 switch device 21 and the SONET/SDH device 22, which serve as the client device 20, transmitting and receiving the client signal as an optical signal having one wavelength, and adding/dropping (multiplexing/demultiplexing) the optical signal having one wavelength to a WDM signal.

Each OADM device 10 includes an optical transponder 11, an optical demultiplexer 12, an optical switch 13, an optical multiplexer 14, an optical amplifier 15, and an optical amplifier 16. The illustrated configuration of the OADM device 10 is an example and a similar function can be provided with even another configuration.

A WDM signal transmitted through the optical fiber transmission line 30 is inputted to the OADM device 10 connected to the transmission line (input-side transmission line) 30. The WDM signal is first inputted to the optical amplifier 15, and the optical power of the WDM signal is amplified. The WDM signal outputted from the optical amplifier 15 is inputted to the optical demultiplexer 12 and demultiplexed into optical signals having respective wavelengths.

The optical signals having respective wavelengths obtained by the demultiplexing are inputted to the optical switch 13, and a signal path is switched, whereby a connection to the optical transponder 11 or a connection to the optical multiplexer 14 is selected. The optical signals inputted to the optical transponder 11 are converted to have a signal interface suited to the client device 20 by the optical transponder 11 and inputted to and received by the layer 2 switch device 21 or the SONET/SDH device 22 of the client device 20.

On the other hand, client signals outputted from the SONET/SDH device 22 or the layer 2 switch device 21 are inputted to the optical transponder 11 and converted to have a signal interface suited to the photonic network NW, in other words, converted into optical signals having respective wavelengths, and the optical signals having respective wavelengths are inputted to the optical switch 13. In this case, as signal interface suited to the photonic network NW, OTN defined in ITU-T Recommendations G.872, SDH defined in ITU-T Recommendations G.803, SONET defined in American National Standards Institute (ANSI) Recommendation, and the like can be applied.

The optical signals from the optical demultiplexer 12 and the optical signals from the optical transponder 11, both of which are outputted from the optical switch 13, are inputted to the optical multiplexer 14, and the optical signals having respective wavelengths are multiplexed and outputted as a WDM signal. The WDM signal outputted from the optical multiplexer 14 is inputted to the optical amplifier 16 where the optical power of the WDM signal is amplified. Then, the WDM signal is outputted to the transmission line (output-side transmission line) 30 connected to the OADM device 10 to be transmitted on the photonic network NW.

[Configuration Examples of Optical Transponder]

Figure 4A:
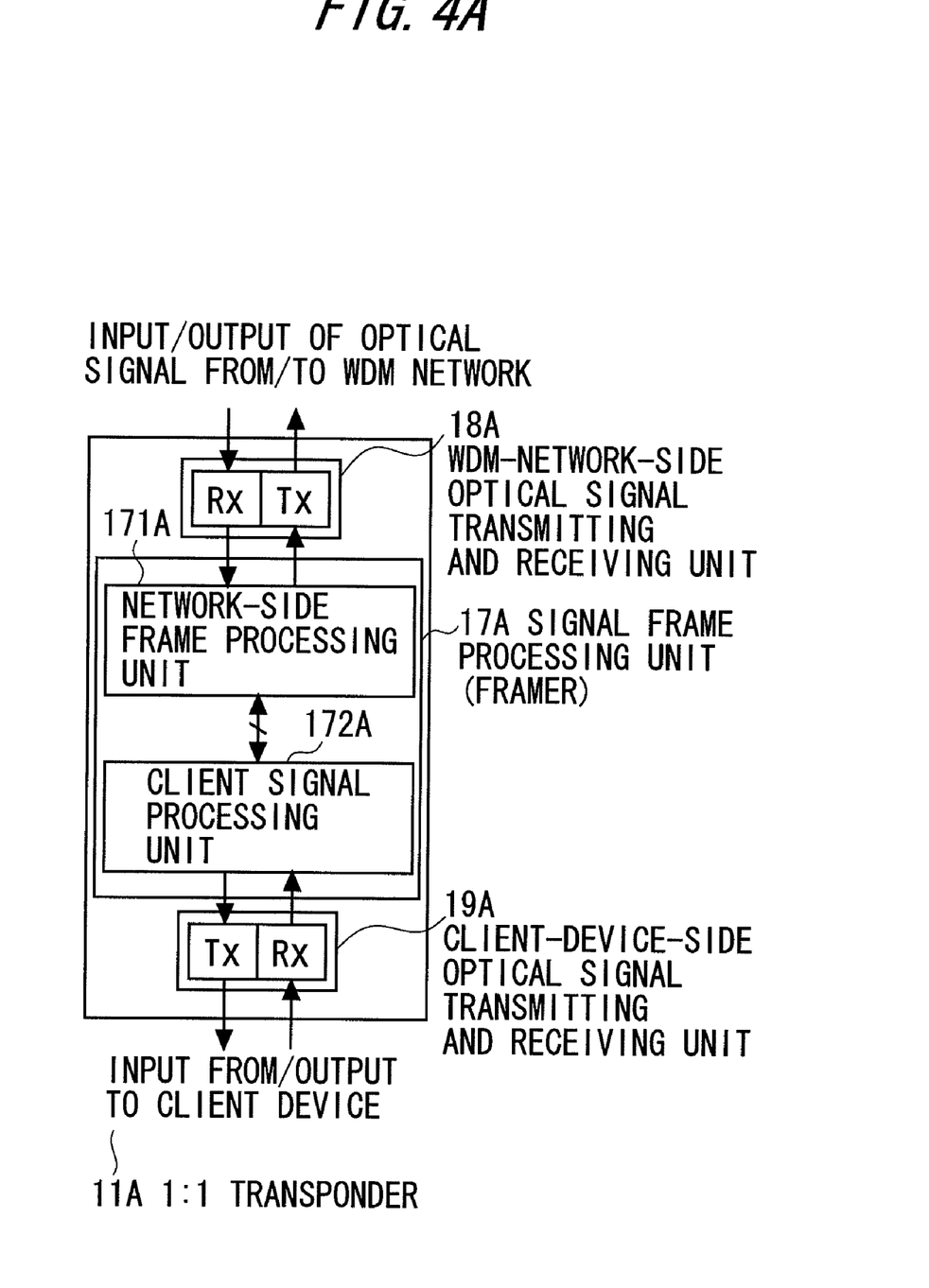
FIG. 4A is a block diagram showing a configuration example of an optical transponder (1-to-1 transponder)
Figure 4B:
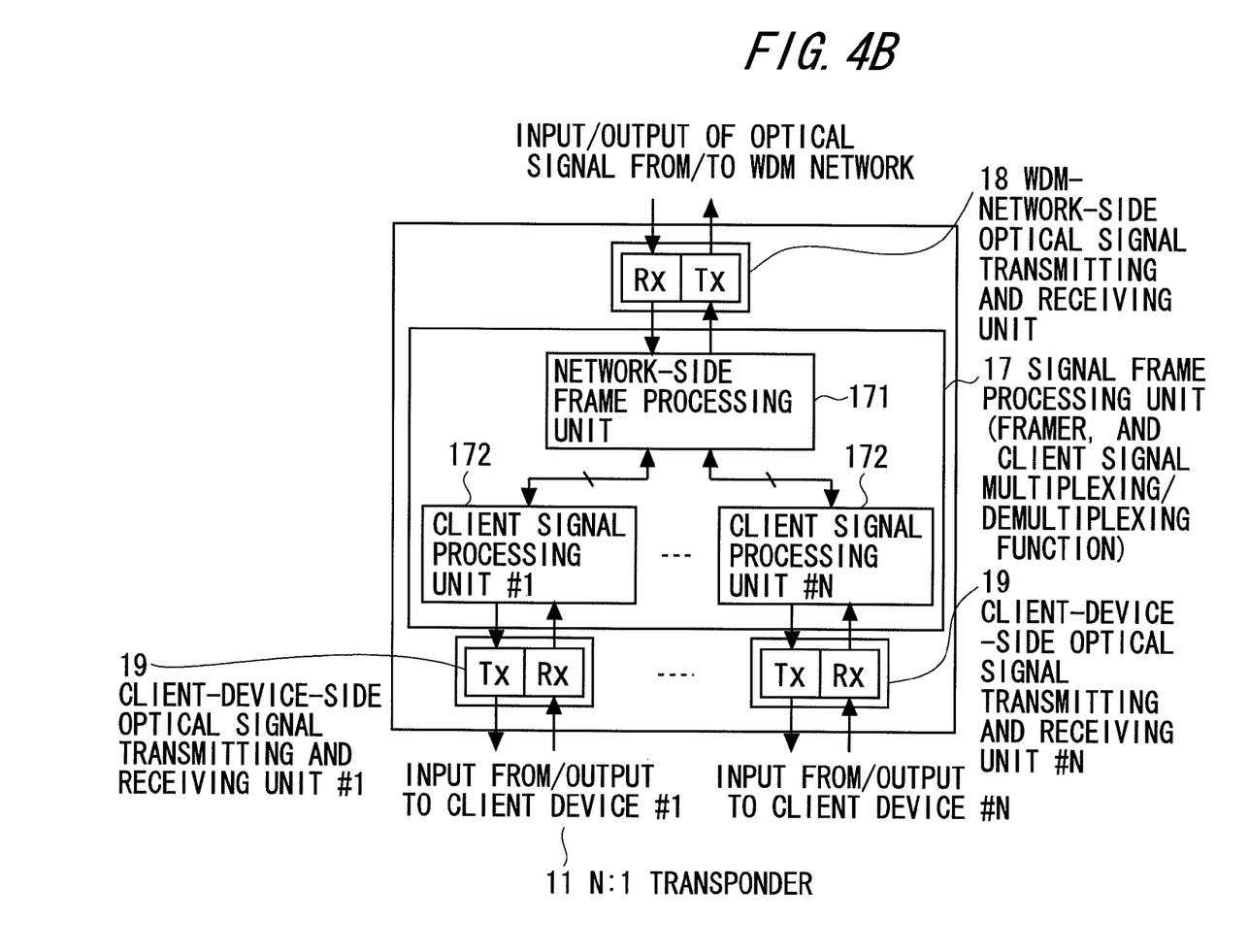
FIG. 4B is a block diagram showing a configuration example of an optical transponder (N-to-1 transponder) applied to the photonic network system shown in FIG. 3.

FIGS. 4A and 4B each show a configuration example of an optical transponder.

An optical transponder 11A shown in FIG. 4A is a 1-to-1 transponder, which has a function of receiving and outputting one client signal as an optical signal having one wavelength. The optical transponder 11A includes a WDM-network-(photonic network)-side optical signal transmitting and receiving unit 18A, a client-device-side optical signal transmitting and receiving unit 19A, and a signal frame processing unit (framer) 17A which has a network-side frame processing unit 171A and a client signal processing unit 172A.

The WDM-network-side optical signal transmitting and receiving unit 18A and the client-device-side optical signal transmitting and receiving unit 19A each have a function of converting an electrical signal of the signal frame processing unit 17A into an optical signal and transmitting the optical signal and a function of converting a received optical signal into an electrical signal and transmitting the electrical signal to the signal frame processing unit 17A.

The network-side frame processing unit 171A has a function of converting a client signal into frames having a network-side signal frame format and a function of performing the reverse processing. As the network-side signal frame format, SDH and OTN defined in ITU-T Recommendations and SONET defined in ANSI Recommendation can be applied. The client signal processing unit 172A has a function of monitoring a client signal, and the like.

The optical transponder 11 shown in FIG. 4B is an N-to-1 transponder which has a function of accommodating multiple (N) client signals and receiving and outputting them as an optical signal having one wavelength, and which is also called a Muxponder. In this case, "N" indicates the number of client signals.

The optical transponder 11 is different from the optical transponder 11A shown in FIG. 4A in that the optical transponder 11 includes N client-device-side optical signal transmitting and receiving units 19 and N client signal processing units 172, and a network-side frame processing unit 171 has a multiplexing/demultiplexing function for N client signals. As the multiplexing/demultiplexing function, Optical Data Unit k (ODUk) multiplexing function for OTN defined in ITU-T Recommendations G.709 can be applied, for example.

The N-to-1 transponder shown in FIG. 4B is applied to the optical transponder 11 included in each of the OADM devices 10 constituting the photonic network system SYS shown in FIG. 3.

[First Solving Technique]

Next, with reference to FIGS. 3, 5A, 5B, and 6, a description is given of a first solving technique (first accommodation method) which allows a SONET/SDH signal having a bit rate of 9.95 Gbps, such as an OC-192, OC-192c, or STM-64 signal, and a 10 GbE-LANPHY signal having a bit rate of 10.3 Gbps to be transparently mapped and accommodated in a mixed manner in one wavelength (one wavelength path) on the photonic network NW having a transmission rate of about 40 Gbps, in the photonic network system SYS of the embodiment of the present invention shown in FIG. 3.

Figure 5A:
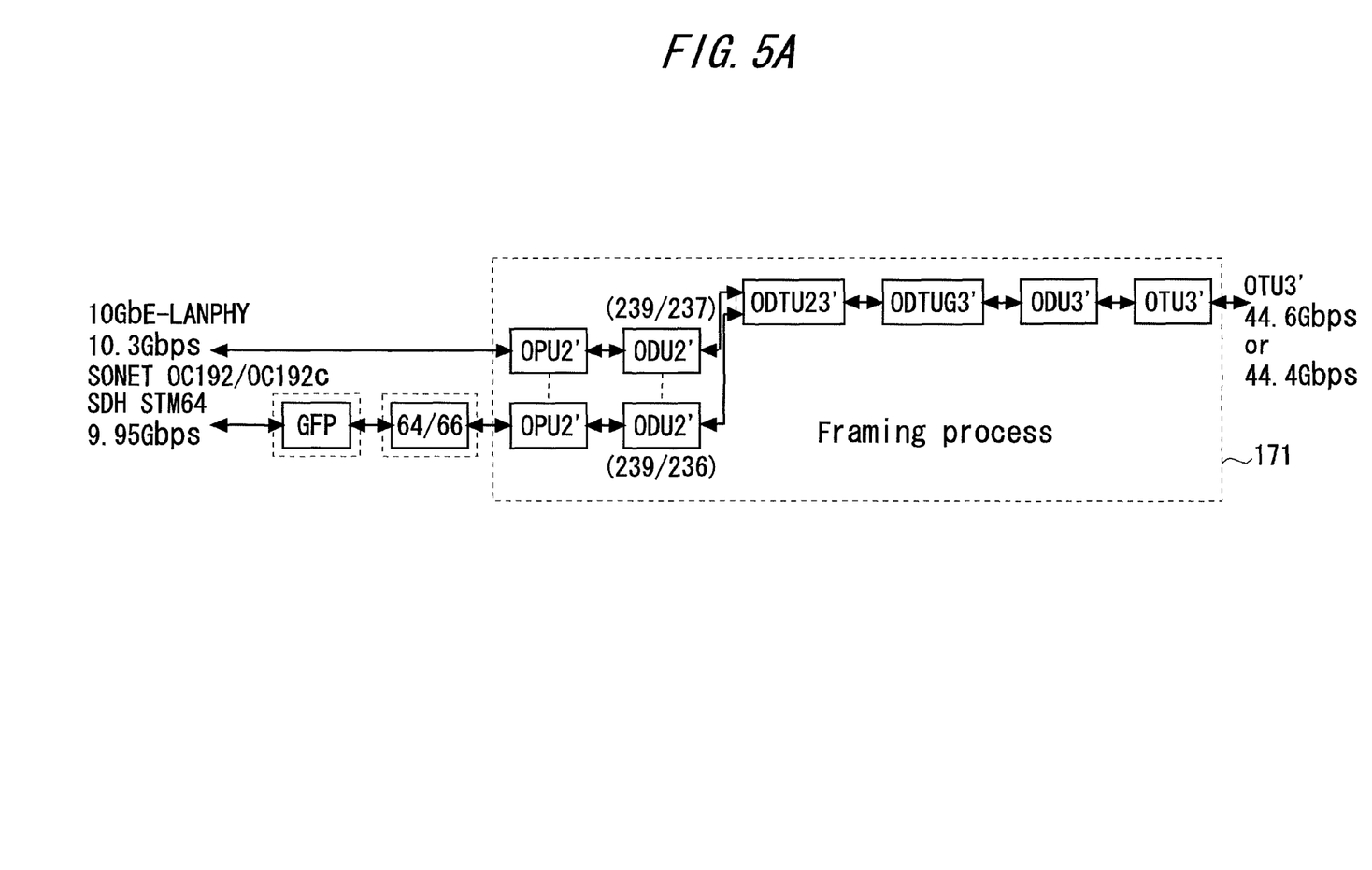
FIG. 5A is a diagram for explaining a multiplexing method of a first solving technique (first accommodation method)
Figure 6:
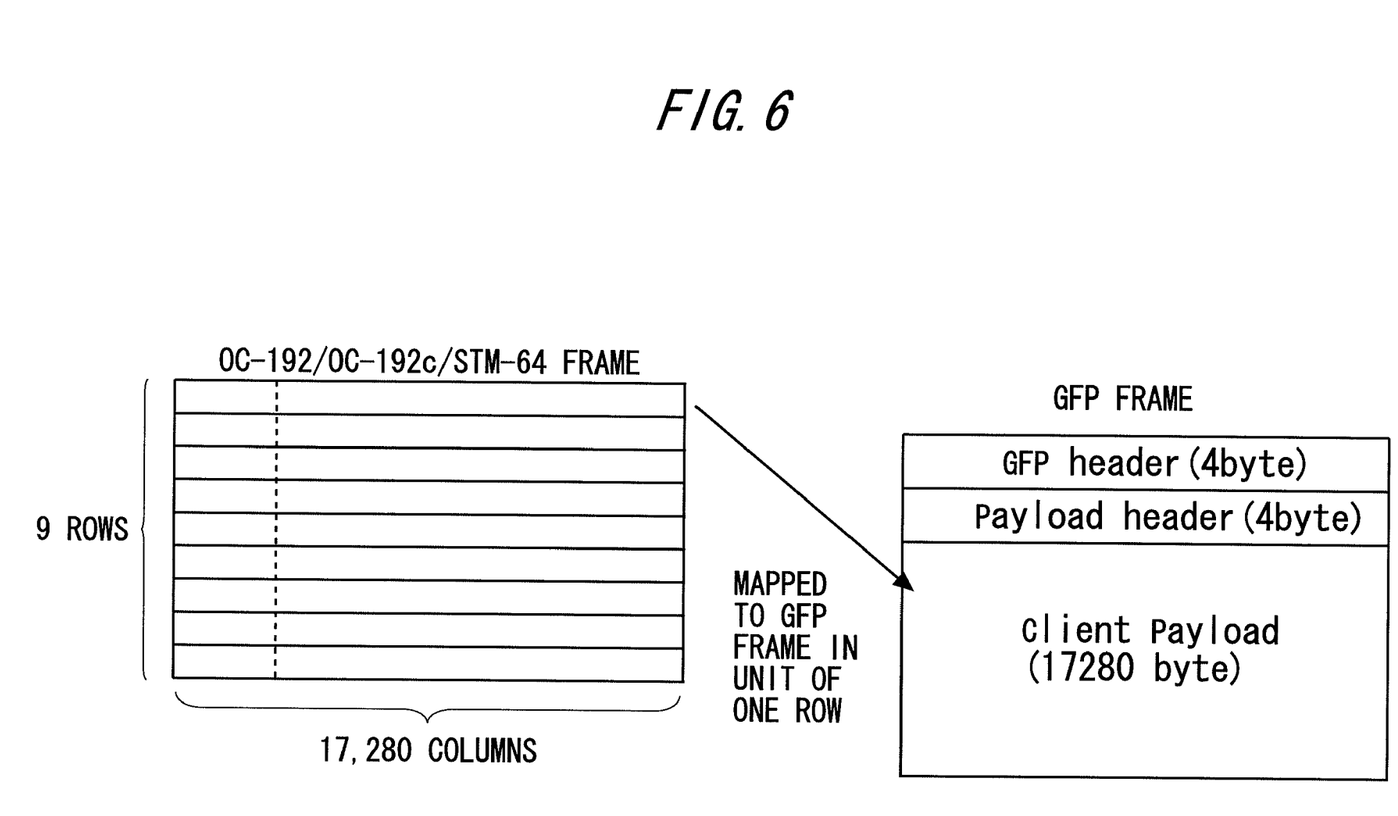
FIG. 6 is a diagram for explaining the multiplexing method of the first solving technique.

In the first solving technique, each row (17,280 bytes) of a frame having 17,280 columns×9 rows (bytes) of a SONET OC-192/OC-192c signal or an SDH STM-64 signal of 9.95 Gbps is subjected to Generic Framing Procedure (GFP) mapping, 64B/66B coding, 239/236 stuffing process, and then mapping to ODU2', thereby performing transparent mapping to an OTU3' frame defined in ITU-T Recommendations G.709 (see FIGS. 5A and 6).

Figure 5B:
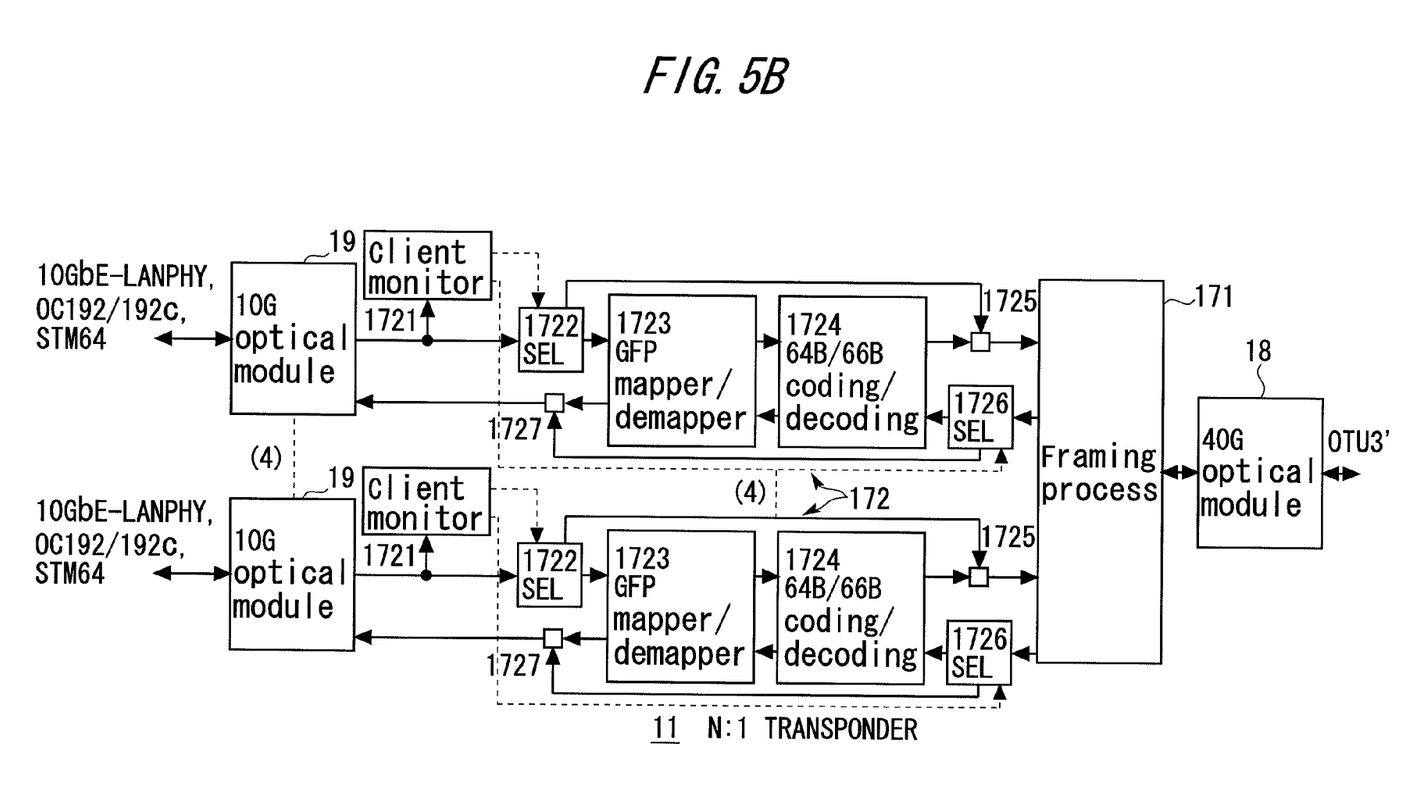
FIG. 5B is a block diagram for explaining the optical transponder applied to the first solving technique.

FIGS. 5A and 5B show a specific example of the first solving technique. FIG. 5A shows a multiplexing method of the first solving technique. FIG. 5B shows a block configuration of the optical transponder 11 for realizing the multiplexing method shown in FIG. 5A.

An explanation is given to an example case where a SONET OC-192/OC-192c signal or an SDH STM-64 signal whose transmission rate is about 9.95 Gbps and a 10 GBASE-R (10 GbE-LANPHY) signal whose transmission rate is about 10.3 Gbps, which are used as client signals, are multiplexed in a mixed manner, and accommodated in an interface and a frame for the photonic network NW.

More specifically, it is assumed that a SONET OC-192c signal whose transmission rate is 9.953280 Gbps and a 10 GBASE-R (10 GbE-LANPHY) signal whose transmission rate is 10.312500 Gbps are used as two client signals having different transmission rates, and a signal corresponding to OTU3 for OTN defined in ITU-T Recommendations is used as an interface and a frame for the photonic network NW. In order to accommodate the two client signals having different transmission rates, a special framing process is applied to the SONET OC-192c signal having a lower transmission rate so as to match the transmission rate of the SONET OC-192c signal and that of the 10 GBASE-R signal, and the SONET OC-192c signal and the 10 GBASE-R signal are multiplexed in a frame format corresponding to OTU3 for OTN.

First, an inputted SONET OC-192c signal is mapped to GFP frames defined in ITU-T Recommendations G.7041. At this time, the size of a client payload information field of a GFP frame is set to 17,280 bytes. This size corresponds to one row of the frame size, i.e., 17,280 (bytes) columns×9 (bytes) rows, of the SONET OC-192c signal. Each row of the SONET OC-192c signal is mapped to the GFP frame (see FIGS. 5A and 6).

Then, the SONET OC-192c signal mapped to the GFP frames is subjected to 64B/66B coding. Note that the 64B/66B coding is equivalent to a process defined by Physical Coding Sublayer (PCS) of 10 GBASE-R. The signal, which has been subjected to the 64B/66B coding, is inputted to a Framing process unit 171 shown in FIG. 5B (corresponding to the network-side frame processing unit 171 of FIG. 4B). The inputted signal is mapped to a frame (OPU2' of FIG. 5A) corresponding to OPU2 for OTN and then mapped to a frame (ODU2') corresponds to ODU2.

At this time, fixed stuffing is an insertion of (16 bytes+16 bytes)×4 rows into the payload part of the ODU2' frame. This fixed stuffing process corresponds to "239/236" fixed-stuff insertion for ODU3. The ODU2' frame is accommodated in a frame of ODTU23' corresponding to ODTU23, a frame of ODTUG3' corresponding to ODTUG3, a frame of ODU3' corresponding to ODU3, and a frame of OTU3' corresponding to OTU3.

The transmission rate of the ODU2' frame which has accommodated the SONET OC-192c signal in this manner is equal to (OC-192c signal transmission rate)×(GFP mapping)×(64B/66B coding)×(ODU2' fixed stuff), that is, 9.953280000 Gbps×(17,288/17,280)×(66/64)×(239/236), which equals 10.399611051 Gbps.

In contrast, when the 10 GBASE-R signal is accommodated in the ODU2' frame, a special coding is not applied to the 10 GBASE-R signal before accommodation in OPU2' and ODU2' frames. The fixed stuffing process for the ODU2' frame corresponds to "239/237" fixed-stuffing process for ODU2 for OTN. Specifically, "16 bytes×4 rows" are inserted to the payload part of the ODU2 frame. Accordingly, the transmission rate of the ODU2' frame which has accommodated the 10 GBASE-R signal is equal to (10 GBASE-R signal transmission rate)×(ODU2' fixed stuff), that is, 10.312500000 Gbps×(239/237), which equals 10.399525316 Gbps.

The difference in transmission rate between the ODU2' frame which has accommodated the 10 GBASE-R signal and the ODU2' frame which has accommodated the OC-192c signal is 85,734 bps. This frequency difference can be compensated by a justification control function, which is a frequency adjustment function for OTN. Therefore, the ODU2' frame which has accommodated the OC-192c signal and the ODU2' frame which has accommodated the GBASE-R signal can be multiplexed in a mixed manner in the OTU3' frame.

Note that, at this time, the transmission rate of the OTU3' frame is 4×(10 GBASE-R signal transmission rate)×(ODU3 fixed stuff process)×(OTU3 FEC coding process), that is, 4×10.312500000 Gbps×(239/236)×(255/239), which equals 44.570974576 Gbps.

The expressions of "a frame of OTU3' corresponding to OTU3 for OTN" and the like are used because the transmission rates of OTUk', ODUk', and OPUk' frames are different from the transmission rates of OTUk, ODUk, and OPUk frames defined in ITU-T Recommendations, respectively. When an STU3 frame is taken as an example, the transmission rate of the OTU3 frame defined in ITU-T Recommendations G.709 is 43.018413559 Gbps whereas the transmission rate of the OTU3' frame is 44.570974576 Gbps. Note that although transmission rates are different, all the frame structures (formats) conform to ITU-T Recommendations G.709.

In the optical transponder (N-to-1 transponder) 11 shown in FIG. 5B, a 10G optical module unit (optical transceiver module unit) 19 provides: an optical/electrical (O/E) conversion function of converting, upon reception of an optical signal having a transmission rate of about 10 Gbps (about 9.95 Gbps in the case of the SONET OC-192c signal, and about 10.3 Gbps in the case of the 10 GbE-LANPHY signal) from the client device 20 that includes the layer 2 switch device 21 and the SONET/SDH device 22, the optical signal into an electrical signal and outputting the electrical signal to the signal frame processing unit 17; and an electrical/optical (E/O) conversion function of converting, upon reception of an electrical signal outputted from the signal frame processing unit 17, the electrical signal into an optical signal and outputting the optical signal to the client device 20. The 10G optical module unit 19 corresponds to the client-device-side optical signal transmitting and receiving unit 19 of FIG. 4B.

A client monitor unit 1721 provides a function of identifying the type of a signal outputted from the 10G optical module unit 19. For example, the client monitor unit 1721 identifies whether a signal outputted from the 10G optical module unit 19 is a SONET OC-192c signal or a 10 GbE-LANPHY signal.

A SEL unit (selection unit) 1722 provides a signal switching function with one input and two outputs. The SEL unit 1722 switches a signal output destination according to a control signal outputted from the client monitor unit 1721, which has the function of identifying the type of an input signal from the 10G optical module unit 19. For example, when the input signal is a SONET OC-192c signal, the SEL unit 1722 connects the signal to a GFP mapper/demapper unit 1723. When the input signal is a 10 GbE-LANPHY signal, the SEL unit 1722 connects the signal to the Framing process unit 171 (corresponding to the network-side frame processing unit 171 of FIG. 4B) via a signal combining unit 1725 disposed at a subsequent stage of a 64B/66B coding/decoding unit 1724. Note that a SEL unit (selection unit) 1726 functions in the same way according to a control signal outputted from the client monitor unit 1721, together with a signal combining unit 1727. Since the SONET OC-192c signal and the 10 GBASE-R (10 GbE-LANPHY) signal, which are assumed to be client signals in this case, are bidirectional signals, it is possible to control both of the SEL unit 1722 connected to an output of the 10G optical module unit 19 and the SEL unit 1726 connected to an output of the Framing process unit 171 by just identifying the type of a signal outputted from the 10G optical module unit 19.

The client monitor unit 1721, the SEL units 1722 and 1726, the GFP mapper/demapper unit 1723, the 64B/66B coding/decoding unit 1724, and the signal combining units 1725 and 1727 are included in each of the client signal processing units 172 of FIG. 4B, and constitute the signal frame processing unit 17 together with the Framing process unit 171 corresponding to the network-side frame processing unit 171.

A 40G optical module unit (optical transceiver module unit) 18 provides: an optical/electrical (O/E) conversion function of converting, upon reception of an optical signal having a transmission rate of about 40 Gbps from the photonic network (WDM network) NW, the optical signal into an electrical signal and outputting the electrical signal to the signal frame processing unit 17; and an electrical/optical (E/O) conversion function of converting, upon reception of an electrical signal outputted from the signal frame processing unit 17, the electrical signal into an optical signal and outputting the optical signal to the WDM network. The 40G optical module unit 18 corresponds to the WDM-network-side optical signal transmitting and receiving unit 18 of FIG. 4B.

In the above-mentioned optical transponder (N-to-1 transponder) 11, the existing techniques such as a framing technique for OTN defined in ITU-T Recommendations G.709, a GFP technique defined in ITU-T Recommendations G.7041, and a 64B/66B coding technique used in 10 GbE PCS defined in IEEE 802.3 Recommendations are employed in an optimal combination. Thus, the optical transponder (N-to-1 transponder) 11 can easily be realized by applying the existing Application Specific Integrated Circuit (ASIC) and the like. Examples of ASIC are shown below.

An existing OTN framer LSI that supports OTU3 can be applied to the Framing process unit 171, and is manufactured by NEL or the like.

URL:https://www.nel.co.jp/new/information/interop2006.html

An existing LSI for GFP can be applied to the GFP mapper/demapper unit 1723, and examples of the existing LSI for GFP include EP1C12F256C6 manufactured by ALTERA.

URL:http://www.altera.co.jp/products/ip/communications/pack et/m-int-gfpt.html

An existing LSI for 10 GbE can be applied to the 64B/66B coding/decoding unit 1724, and examples of the existing LSI for 10 GbE include BCM8704 manufactured by Broadcom.

URL:http://ja.broadcom.com/products/Enterprise-Small-Office/10-Gigabit-Ethernet-Transceivers/BCM8704

[Second Solving Technique]

Next, with reference to FIGS. 3, 7A, 7B, and 8, a description is given of a second solving technique (second accommodation method) which allows a SONET/SDH signal having a bit rate of 9.95 Gbps, such as an OC-192, OC-192c, or STM-64 signal, and a 10 GbE-LANPHY signal having a bit rate of 10.3 Gbps to be transparently mapped and accommodated in a mixed manner in one wavelength (one wavelength path) on the photonic network NW having a transmission rate of about 40 Gbps, in the photonic network system SYS of the embodiment of the present invention shown in FIG. 3.

Figure 7A:
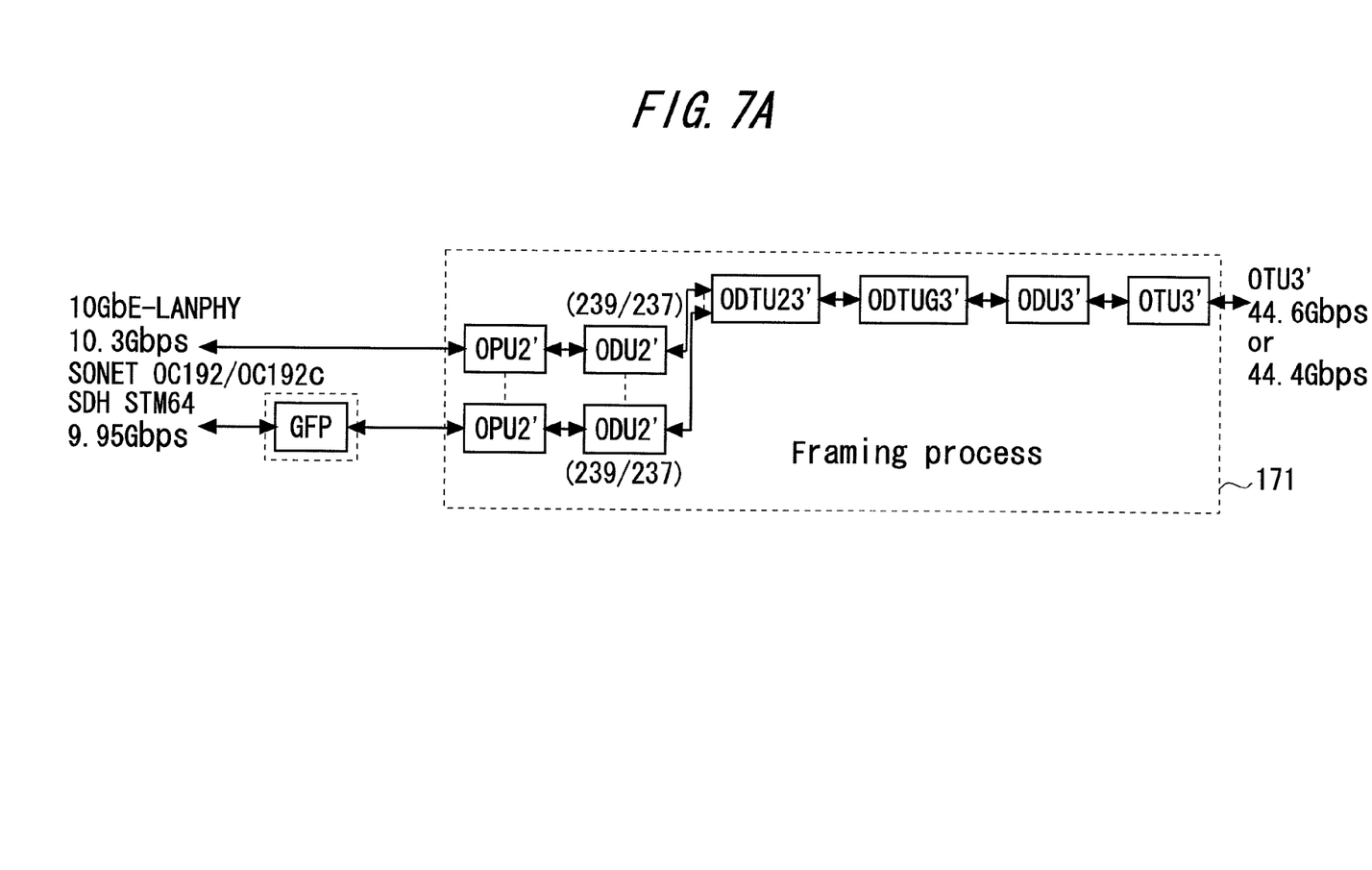
FIG. 7A is a diagram for explaining a multiplexing method of a second solving technique (second accommodation method)
Figure 8:
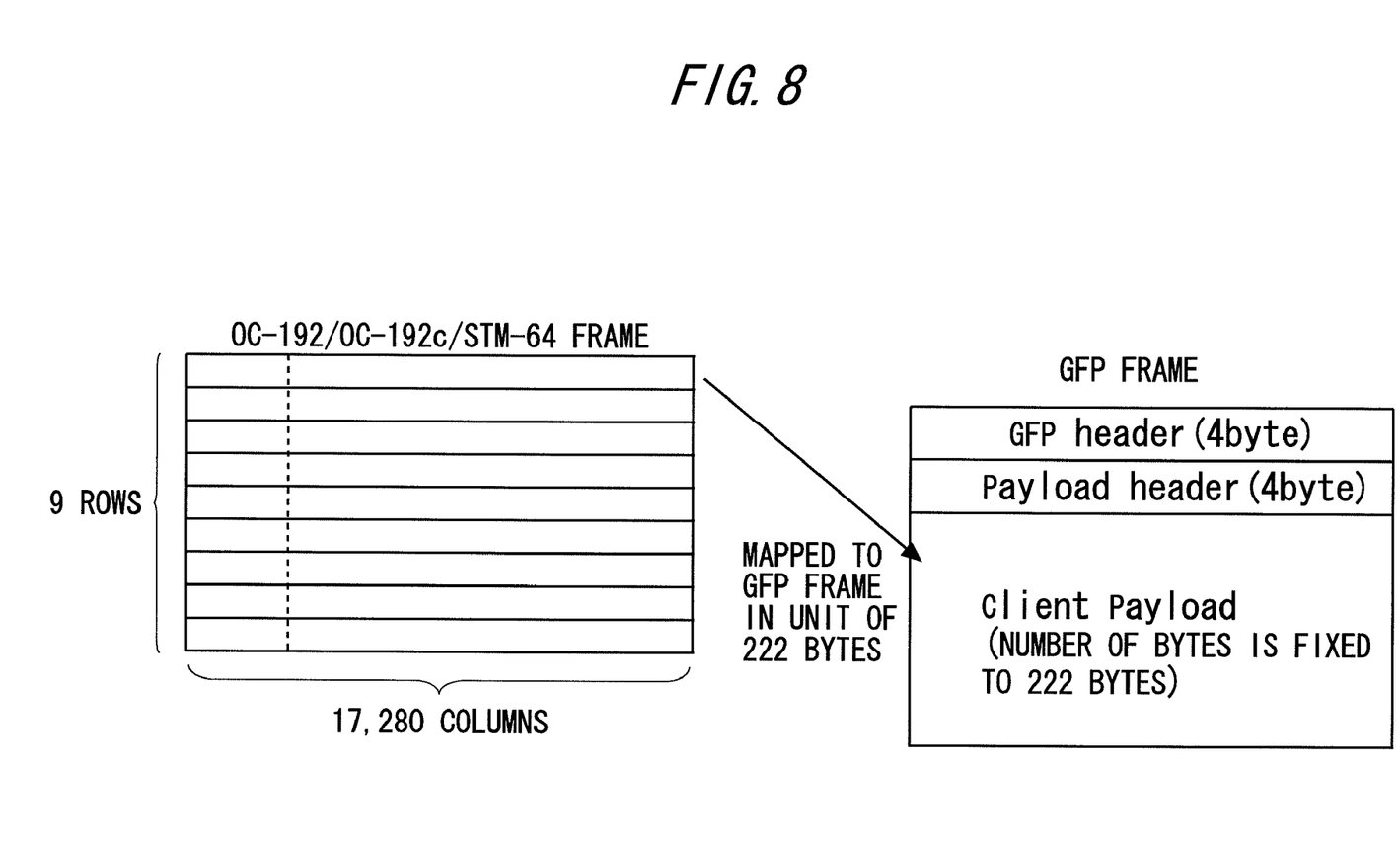
FIG. 8 is a diagram for explaining the multiplexing method of the second solving technique.

In the second solving technique, a frame of a SONET OC-192/OC-192c signal or an SDH STM-64 signal of 9.95 Gbps is mapped to a GFP frame in which the size of the client payload is fixed to 222 bytes, accommodated in ODTU2' of 239/237, and then sequentially multiplexed in ODTU23', ODTUG3', ODU3', and OTU3' frames defined in ITU-T Recommendations G.709 (see FIGS. 7A and 8).

Figure 7B:
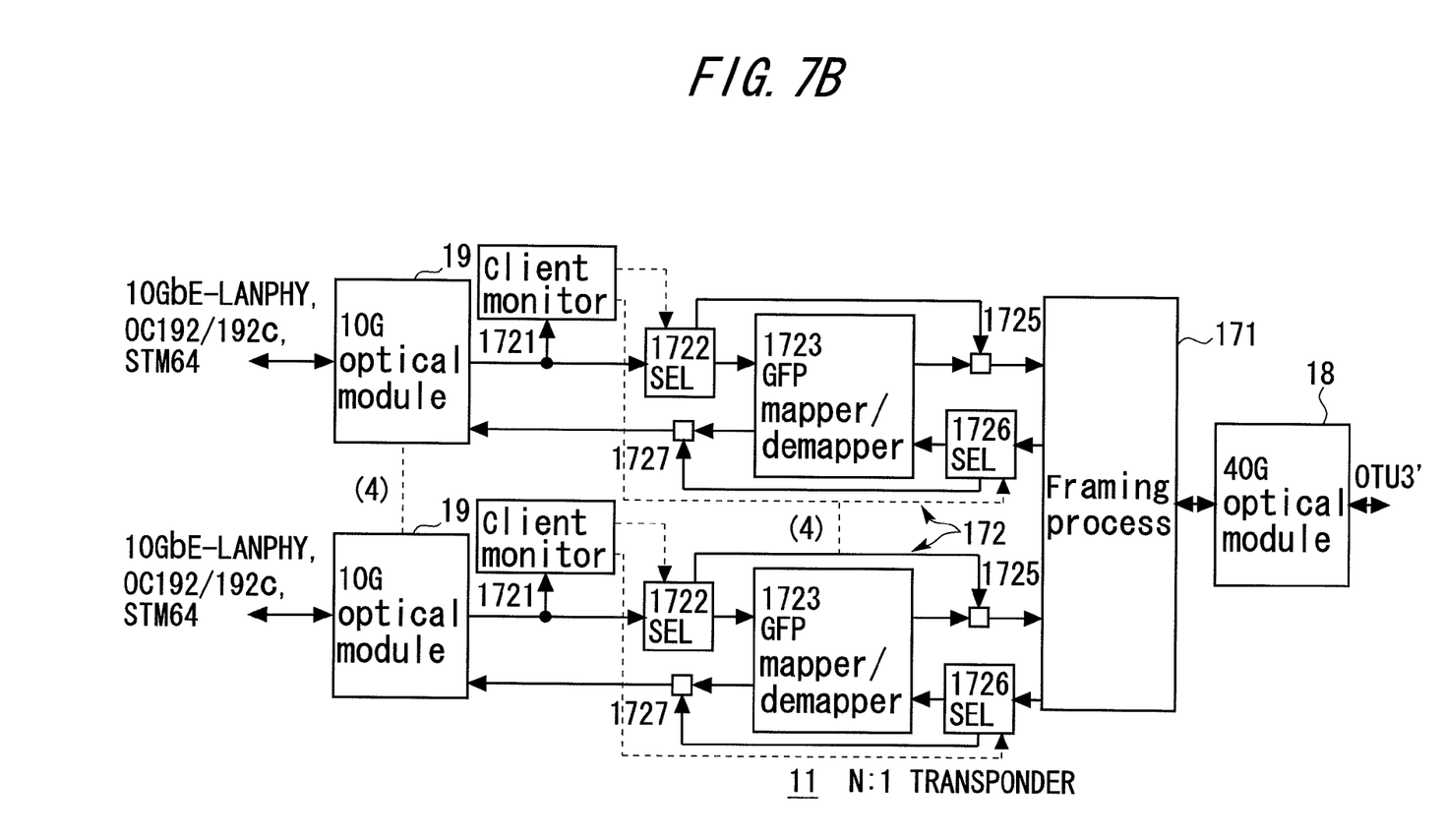
FIG. 7B is a block diagram for explaining an optical transponder applied to the second solving technique.

FIGS. 7A and 7B show a specific example of the second solving technique. FIG. 7A shows a multiplexing method of the second solving technique. FIG. 7B shows a block configuration of an optical transponder 11 for realizing the multiplexing method shown in FIG. 7A.

In this case, as in the first solving technique, an explanation is given to an example case where a SONET OC-192c signal whose transmission rate is 9.953280 Gbps and a 10 GBASE-R (10 GbE-LANPHY) signal whose transmission rate is 10.312500 Gbps are used as two client signals having different transmission rates.

An inputted SONET OC-192c signal is mapped to a GFP frame defined in ITU-T Recommendations G.7041. At this time, the size of the client payload information field of the GFP frame is set to 222 bytes (see FIG. 8).

Then, the SONET OC-192c signal mapped to GFP frames is inputted to the Framing process unit 171 shown in FIG. 7B (corresponding to the network-side frame processing unit 171 of FIG. 4B). The inputted signal is mapped to a frame (OPU2' of FIG. 7A) corresponding to OPU2 for OTN and then mapped to a frame (ODU2' of FIG. 7A) corresponding to ODU2.

At this time, fixed stuffing is performed according to a "239/237" fixed-stuffing process which is an insertion of "16 bytes×4 rows" into the payload part of the ODU2' frame. The ODU2' frame is sequentially accommodated in a frame of ODTU23' corresponding to ODTU23, a frame of ODTUG3' corresponding to ODTUG3, a frame of ODU3' corresponding to ODU3, and a frame of OTU3' corresponding to OTU3.

The transmission rate of the ODU2' frame which has accommodated the SONET OC-192c signal in this manner is equal to (OC-192c signal transmission rate)×(GFP mapping)×(ODU2' fixed stuff), that is, 9.953280000 Gbps×(230/222)×(239/237), which equals 10.398977489 Gbps.

In contrast, when the 10 GBASE-R signal is accommodated in the ODU2' frame, a special coding is not applied to the 10 GBASE-R signal before accommodation in OPU2' and ODU2' frames. Further, the fixed stuffing process for the ODU2' frame corresponds to "239/237" fixed-stuffing process for ODU2 for OTN. Specifically, an insertion of 16 bytes×4 rows is applied to the payload part of the ODU2 frame. Accordingly, the transmission rate of the ODU2' frame which has accommodated the GBASE-R signal is equal to (10 GBASE-R signal transmission rate)×(ODU2' fixed stuff), that is, 10.312500000 Gbps×(239/237), which equals 10.399525316 Gbps.

The difference in transmission rate between the ODU2' frame which has accommodated the 10 GBASE-R signal and the ODU2' frame which has accommodated the OC-192c signal is −547,828 bps. This frequency difference can be compensated by the justification control function, which is the frequency adjustment function for OTN. Therefore, the ODU2' frame which has accommodated the OC-192c signal and the ODU2' frame which has accommodated the GBASE-R signal can be multiplexed in a mixed manner in the OTU3' frame.

The optical transponder (N-to-1 transponder) 11 shown in FIG. 7B is different only in their components from the optical transponder 11 shown in FIG. 5B in that the optical transponder 11 of FIG. 7B does not include the 64B/66B coding/decoding unit 1724.

Effect of the Embodiment

According to the above-mentioned embodiment, it is possible to accommodate both of a 10 GbE-LANPHY signal and a SONET OC-192/OC-192c signal or an SDH STM-64 signal, each having a bit rate of about 10 Gbps, and map the signals in a single 40-Gbps wavelength path (frame corresponding to OTU3 defined in ITU-T G.709).

Therefore, the 10 GbE-LANPHY signal and the SONET/SDH signal can be seamlessly handled in the WDM network system based on OTN defined in ITU-T G.709. Further, when signals of about 10 Gbps are multiplexed in a frame corresponding to OTU3, the efficiency of band occupation is improved and wavelength resources are effectively used, thereby improving the operation efficiency of the WDM network.

[Modification]

The above-mentioned processes of the embodiment are provided as a program which can be executed by a computer, and the program can be provided in the form of a recording medium such as a CD-ROM and a flexible disk or through a communication line. It is also possible to implement the present invention by selecting and combining some or all of the respective processes of the embodiment.

The disclosure of Japanese Patent Application No. JP2006-268711 filed on Sep. 29, 2006 including the specification, claims, drawings and abstract is incorporated herein by reference in its entirety.

What is claimed is:

1. An optical transponder, comprising:
    a mapping unit applying a Generic Framing Procedure (GFP) frame mapping process to a first client signal having a lower transmission rate than a second client signal and mapping the first client signal to a (GFP) frame;
    a coding unit applying 64B/66B coding to the first client signal to which the mapping unit has applied the GFP frame mapping process; and
    a multiplexing unit multiplexing the first client signal to which the 64B/66B coding has been applied and the second client signal in a frame conforming to an Optical Transport Network (OTN); and
    wherein the first client signal and the second client signal are accommodated in an identical frame in a mixed manner and transmitted as an optical signal having one wavelength.

2. An optical transponder according to claim 1, wherein the mapping unit maps 17,280 columns by 9 rows in a frame of the first client signal to the GFP frame in a unit of one row.

3. An optical transponder according to claim 1, wherein the multiplexing unit applies a 239/236 stuffing process defined in ITU-T Recommendations to the first client signal to which the 64B/66B coding has been applied.

4. An optical transponder according to claim 1, wherein the first client signal is a SONET/SDH signal of about 10 Gbps or a 10 GbE-WANPHY signal and the second client signal is a 10 GbE-LANPHY signal.

5. An optical signal transmission method, comprising:
    applying, by a mapping unit, a Generic Framing Procedure (GFP) frame mapping process to a first client signal having a lower transmission rate than a second client signal, wherein the GFP frame mapping process maps each row in a frame of the first client signal to a GFP frame;
    applying, by a coding unit, 64B/66B coding to the first client signal to which the GFP frame mapping process has been applied;
    applying, by a multiplexing unit, a 239/236 stuffing process to the first client signal to which the 64B/66B coding has been applied; and
    multiplexing the first client signal to which the 239/236 stuffing process has been applied and the second client signal in a frame conforming to an Optical Transport Network (OTN); and
    wherein the first client signal and the second client signal are accommodated in an identical frame in a mixed manner and transmitted as an optical signal having one wavelength.

* * * * *